United States Patent [19] [11] 4,169,875
Laska et al. [45] Oct. 2, 1979

[54] METHOD OF PRODUCING A TUBULAR BODY OF POLYCRYSTALLINE ALUMINA

[75] Inventors: Harry M. Laska, Euclid; Nelson Grimm, South Euclid, both of Ohio

[73] Assignee: General Electric Company, Schenectady, N.Y.

[21] Appl. No.: 919,848

[22] Filed: Jun. 28, 1978

Related U.S. Application Data

[62] Division of Ser. No. 776,758, Mar. 11, 1977, abandoned.

[51] Int. Cl.² ............... C04B 35/64; C04B 35/10; F27B 9/04
[52] U.S. Cl. ............................ 264/63; 106/73.4; 264/66; 264/209
[58] Field of Search ............ 106/73.4; 313/224, 220; 264/65, 63, 66, 209

[56] References Cited

U.S. PATENT DOCUMENTS

| | | | |
|---|---|---|---|
| 3,026,210 | 3/1962 | Coble | 106/65 |
| 3,248,590 | 4/1966 | Schmidt | 106/65 UX |
| 3,725,094 | 4/1973 | Levy et al. | 106/73.4 |
| 3,769,049 | 10/1973 | Muta et al. | 106/73.4 |
| 3,802,893 | 4/1974 | Kiger et al. | 106/73.4 |
| 3,834,915 | 9/1974 | Cleveland et al. | 106/73.4 |
| 3,846,146 | 11/1974 | Hunting et al. | 106/73.4 |
| 3,875,277 | 4/1975 | Bratton et al. | 106/73.4 |
| 3,905,845 | 9/1975 | Kobayashi et al. | 106/73.4 |
| 3,935,495 | 1/1976 | Scott, Jr. et al. | 313/220 |
| 4,031,177 | 6/1977 | Auriol et al. | 106/65 |

*Primary Examiner*—O. R. Vertiz
*Assistant Examiner*—Mark Bell
*Attorney, Agent, or Firm*—John F. McDevitt; Lawrence R. Kempton; Frank L. Neuhauser

[57] ABSTRACT

Increased optical transmission is provided for a body of light transmissive polycrystalline alumina having relatively uniform size equiaxed grains of alumina and which is essentially free of porosity and secondary phase material. A tube of the improved optical material can be used as the light transmissive envelope for high intensity discharge lamps especially sodium and other metal vapor lamps exhibiting increased light output as a result of said improved optical transmission. A method of producing the improved optical material is also disclosed.

2 Claims, 2 Drawing Figures

METHOD OF PRODUCING A TUBULAR BODY OF POLYCRYSTALLINE ALUMINA

This is a division of application Ser. No. 776,758, filed Mar. 11, 1977 and now abandoned.

BACKGROUND OF THE INVENTION

The present invention relates generally to a transmissive body of high density polycrystalline alumina exhibiting improved total optical transmission as well as in-line transmission. A tubular form of the optically improved material when used as the light transmissive envelope for the high intensity electric discharge lamp provides higher light output than can generally be obtained with conventional polycrystalline alumina material. Such improvement is attributable to uniformity in the size and shape of the individual alumina grains along with substantial absence of pores and any secondary phase at the grain boundaries in said material.

The polycrystalline alumina material made in accordance with U.S. Pat. No. 3,026,210—Coble, assigned to the assignee of the present invention, has proven generally useful for the light transmissive envelope in high intensity electric discharge lamps. This polycrystalline alumina material is characterized by relatively uniform large grain size and can be prepared with a minimum of secondary phase magnesia-alumina spinel at the grain boundaries in order to provide optimum in-line transmission. A number of further modified polycrystalline alumina materials are also known which are said to exhibit improved in-line transmission attributable to either an addition of various grain-growth inhibiting agents in the powdered alumina mixture along with magnesia or otherwise varying the method of preparation. For example, a uniform grain structure of reduced size is said to be achieved in U.S. Pat. Nos. 3,711,585 and 3,792,142 by adding lanthana and/or yttria along with magnesia to the pure alumina powder to provide combined in-line transmission improvement and greater mechanical strength. A different approach which does not include any addition of grain-growth inhibiting oxides other than magnesia to achieve the same kind of improvement is described in U.S. Pat. No. 3,311,482 where a small size and uniform grain structure is said to be obtained by modifying the sintering conditions. All said variations do not eliminate secondary phase in the final sintered product, however, which contributes to reduced in-line transmission by reason of differences in refractive index between alumina and the secondary phase material.

It has further long been recognized in U.S. Pat. No. 3,026,177, assigned to the present assignee, that residual pores in the final sintered product must also be suppressed for optimum in-line transmission. A recent investigation finds that a pore volume fraction as small as $10^{-2}$–$10^{-3}$ can be primarily responsible for light scattering in polycrystalline alumina material and thereby have more of a detrimental effect than either grain boundary or secondary phase scattering. The means utilized to reduce porosity in accordance with this patented method of preparation features no use of a grain growth inhibiting additive in the powdered alumina starting material in combination with a two-stage sintering technique said to enhance removal of residual trapped pores. Such necessity for double sintering under special conditions and the attendant costs involved, however, has not lead to significant commercialization of said method.

The light output or luminous output of high intensity electric discharge lamps, especially sodium vapor lamps, depends upon the optical transmission of the light transmissive envelope wherein the arc discharge is generated. More particularly, the in-line transmission characteristics of said envelope are especially critical since passage of the emitted radiation without internal reflection has important advantages. Internal reflection of the generated radiation within said lamp envelope can result in significant absorption of the reflected radiation by the arc discharge. Passage of the generated radiation through the lamp envelope walls without reflection also affects heat flow and temperature distribution for the lamp in a desirable manner. By minimizing such internal reflection for improved in-line transmission, it has been found that the lamp envelope walls run significantly cooler which can permit lamp redesign to run the arc discharge at higher temperatures for both greater efficiency and a more desirable whiter color of lamp emission. Consequently, there is a continuing need to provide still greater in-line transmission for polycrystalline alumina material and in a manner which does not require costly modification of existing commercial manufacture.

SUMMARY OF THE INVENTION

It has been found, surprisingly, that in-line transmission of polycrystalline alumina material can be significantly increased to such a degree that the light output characteristics of high intensity electric discharge lamps utilizing the improved material reflects this change. Such improvement results from an increase in total optical transmission between about 0.5 to 1 percent which is further accompanied by a two- to three-fold increase in the in-line transmission of the improved material compared to the previously manufactured product. Specifically, these improvements are attributable to utilizing a sintered body of polycrystalline alumina material consisting essentially of relatively uniform size equiaxed grains of alumina containing no more than about 150 parts per million of magnesium but essentially devoid of both secondary phase and residual pores. The total optical transmission of the improved material has been found to be at least 93 percent at a 0.75 mm sample thickness for the entire visible wavelength range. As a still further improvement, it has also been found that the flux polishing treatment of said material taught in U.S. Pat. No. 3,935,495 produces additional increase of in-line transmission for the flux polished material. The flux polishing can be further characterized as a reduction of the high spots on the individual surface alumina grains without materially etching the grain boundaries. A method of preparing the improved material that provides an average grain size of approximately 26 microns diameter and where substantially all grains have an average diameter in the range extending from about 20 microns diameter up to about 35 microns diameter is hereinafter described for the preferred embodiments.

DESCRIPTION OF THE PREFERRED EMBODIMENTS

Figure 1:
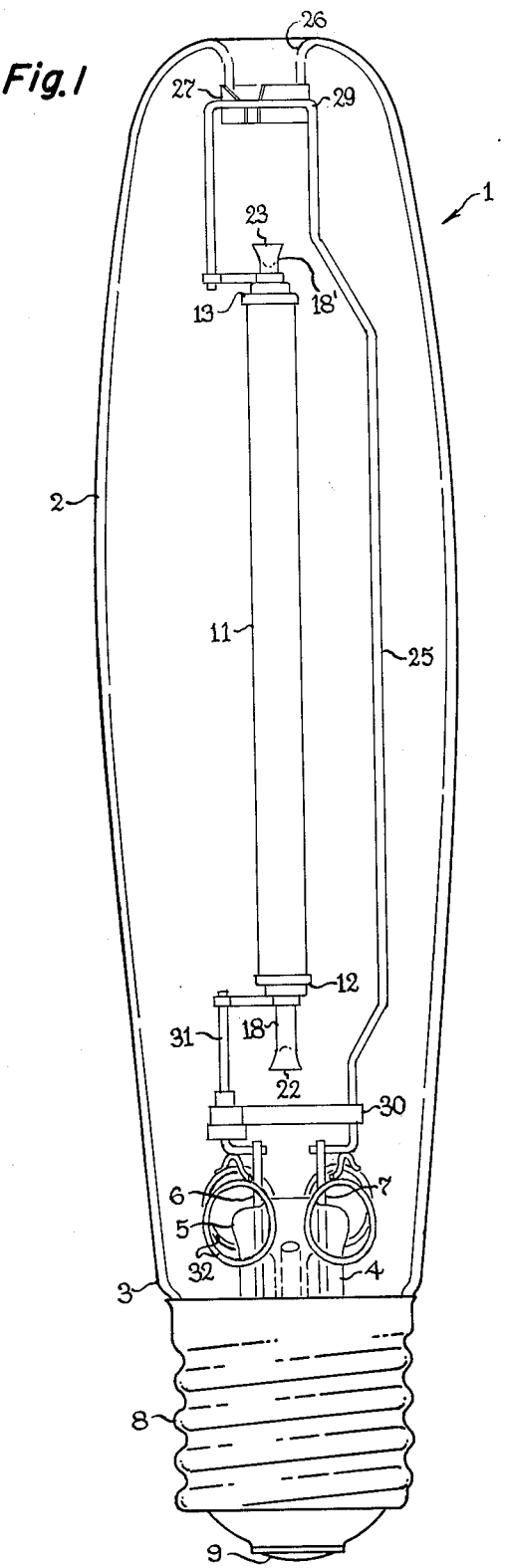
FIG. 1 is a schematic view of a jacketed high pressure sodium vapor lamp embodying the improved polycrystalline alumina material of the present invention.

A high intensity sodium vapor discharge lamp in which the invention may be embodied as illustrated at 1 in FIG. 1 and comprises an outer vitreous envelope or jacket 2 of elongated ovoid shape. The neck 3 of the jacket is closed by a re-entrance stem 4 having a press seal 5 through which extends stiff in-lead wires 6 and 7 which are connected at their outer ends to the threaded shell 8 and center contact 9 of a conventional screw base. The inner envelope or arc tube 11 is made with sintered high density polycrystalline alumina material of the present invention to provide increased in-line optical transmission to a degree more fully explained hereinafter. The ends of the tube are closed by thimble-like niobium metal end caps 12 and 13 which have been hermetically sealed to the improved alumina arc tube by means of a glass sealing composition which is shown exaggerated in thickness at 14 in FIG. 2.

Figure 2:
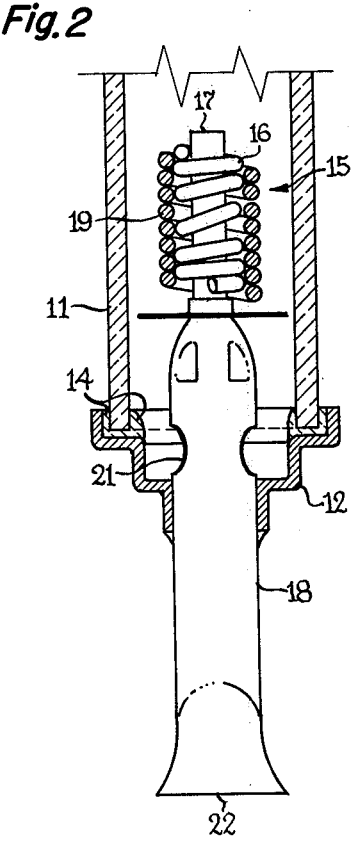
FIG. 2 is a sectional view of an electrode configuration for the lamp depicted in FIG. 1.

Thermionic electrodes 15 are mounted on the ends of the improved arc tube. As best seen in FIG. 2, the electrode comprises an inner tungsten wire coil 16 which is wound over tungsten shank 17 crimped or welded in the end of a niobium tube 18 welded to the end cap. The central turns of the inner coil 16 are spread apart and the outer tungsten wire coil 19 is screwed over the inner coil. A suitable electron emissive mix may be applied to the electrode coils by painting or alternatively by dipping the coils in the emissive mix suspension. The material is retained primarily in the interstices between the turns of outer and inner coil and of inner coil and shank.

Lower tube 18 is pierced through at 21 and is used as an exhaust tube during manufacture of said lamp. After the gas filling sodium mercury amalgam has been introduced into the arc tube, exhaust tube 18 is hermetically pinched off by a cold weld indicated at 22 and serves thereafter as a reservoir for condensed sodium mercury amalgam. Upper tube 18' has no opening in the arc tube and is used to contain a small amount of yttrium metal (not shown) which serves as a getter; the end of the tube is closed by a pinch 23 which forms a hermetic seal. The illustrated lamp is limited to a base-down operation wherein the longer exhaust tube 18, which must be the coolest portion of the arc tube for the amalgam to condense therein, is located lowermost.

The arc tube is supported within the outer envelope by means of a mount comprising a single rod 25 which extends the length of the envelope from in-lead 7 at the stem end to a dimple 26 at the dome end to which it is anchored by a resilient clamp 27. End cap 13 of the improved arc tube is connected to the frame by band 29 while end cap 12 is connected to in-lead 6 through band 30 and support rod 31. The inter-envelope space is desirably evacuated in order to conserve heat; this is done prior to sealing off the outer jacket. A getter, suitably barium-aluminum alloy powder pressed into channeled rings 32 is flashed after sealing in order to insure a high vacuum. A method of manufacturing this type lamp construction is further disclosed in U.S. Pat. No. 3,708,710, hence need not be repeated in connection with the present invention.

Basically, the present improved polycrystalline alumina material is prepared in accordance with the general method taught in the aforementioned Coble patent. Said known method sinters a pressed compact of finely divided alumina powder containing from a small but effective amount up to 0.5 weight percent of finely divided magnesia at elevated temperatures in the range 1700°–1950° C. in an environment selected from the group consisting of vacuum and hydrogen for a sufficient time period to produce a sintered alumina grain structure which desirably retains little or essentially no secondary magnesia alumina spinel phase at the grain boundaries. As further disclosed in said reference patent, the purity of the alumina starting material in said powdered mixture is maintaining about 99 percent purity in order to reduce the amount of secondary phase formation that adversely affects transparency of the final body, especially the in-line transmission through excessive light scattering. Along with said general method of sintering preparation, there is also disclosed in said Coble patent the general technique for measuring total and in-line optical transmission of the sintered body of polycrystalline alumina material which makes it unnecessary to repeat such details in the present specification.

As regards the present departure from the prior art teachings of Coble, however, a particularly reactive alumina starting material has been selected which can be characterized by an even lower level of impurities and more uniform particle size distribution than heretofore used. The present starting material is 99.99 percent pure alumina which is substantially devoid of any grain-growth promoting impurities such as sodium and iron. The present starting alumina material is further characterized by a relatively uniform particle size of submicron diameter which excludes any agglomerates in size exceeding about 10 microns diameter and further demonstrates a relatively uniform surface area of approximately 8–9 square meters per gram. Additionally, the magnesia content in the starting alumina powder mixture is also maintained at 0.1% by weight or less to insure no secondary magnesia-alumina spinel phase in the final sintered product. In the preferred method of preparation, a conventional binder and lubricant is incorporated in said powder mixture to permit extrusion of a pressed compact in the form of tubing and which further requires a presintering step as disclosed in the aforementioned Coble reference in order to remove these further additives prior to sintering. Accordingly, such presintering is carried out in an oxygen containing atmosphere at a temperature from about 950° C. to about 1200° C. before the final sintering operation. The pressed compact has a green density of at least 30 percent of the theoretical density for a single crystal of alumina and about 15 percent shrinkage of said compact occurs during the aforementioned presintering step. A detailed example for the preferred method of preparation is given to more fully describe practice of the present invention.

EXAMPLE

Approximately 8.75 kilograms of high purity alumina powder having the particle size distribution and impurities level above set forth was dry milled for approximately 70 minutes in a vibratory mill after admixture with approximately 8.75 grams of finely divided magnesia. Said admixture was then blended with about 2200 grams of a liquid binder suspension (3 percent by weight organic binder) and 425 grams of a stearate lubricant to prepare a blended admixture suitable for extruding the material in tubular form. The blended admixture was then compacted in an extruder in conventional fashion at a total force in the range 20–35 tons to form the desired shape of pressed compact. The green density of the tubing prepared in this manner reached at least 30-35 percent of the theoretical density for a single crystal of alumina. The green tubing was next presintered in a conventional resistance element furnace utilizing an air atmosphere and heated to about 950°-1000° C. The presintering schedule being employed held the material at said elevated temperatures for approximately 4-6 hours and was further accompanied by slow rates of heating and cooling to avoid adverse temperature effects. The final sintering schedule consisted of firing the presintered material at approximately 1900° C. for about 4 hours in an electric furnace provided with a hydrogen atmosphere.

The optical transmission characteristics of the final sintered product prepared in the foregoing manner were measured employing the same general measurement technique described in the aforementioned Coble patent. Unpolished tubing samples having an approximate 0.75 mm wall thickness were measured. These transmission values were also compared with a sintered polycrystalline alumina product obtained by the same method of preparation above described but utilizing conventional alumina powder in the starting admixture. The conventional sintered product exhibited a total transmission over the visible wavelength spectral region of 92.3 percent as compared with 93.5 percent for the sintered product of the present invention. Correspondingly, the present sintered product exhibited in-line transmission values of 43 and 67 (in arbitrary units) as compared with in-line transmission values of 23.6 and 36.5 for the conventional product over a wavelength region extending from 0.2 micron wavelength to 4.0 microns wavelength.

Further visual comparison of the above respective sintered products was conducted to provide better understanding of the surprising optical transmission improvements exhibited by the present product. While both sintered materials were found to have an average grain size of approximately 26 microns diameter and a relatively uniform equiaxed grain size distribution extending from about 20 microns diameter to about 35 microns diameter, there was found a notable difference between said materials as regards the nature of optical discontinuities existing at the grain boundaries. The present material was found to be substantially devoid of both pores and secondary phase inclusions at the grain boundaries whereas the conventional product contained a far greater number of residual pores. From this difference combined with a further observation that the conventional product did not contain any large concentration of secondary phase inclusions at the grain boundaries, it can be concluded that residual porosity is the primary cause of lower in-line transmission for sintered polycrystalline alumina having no more than about 150 ppm residual magnesium content in the sintered product. It can further be concluded from said observations that a porosity volume fraction as little as 0.01-0.001 can be responsible for substantially lower in-line transmission so that reducing the residual porosity to a $10^{-4}$ volume fraction level should provide in-line transmission comparable to that obtained with a single crystal of alumina.

What we claim as new and desire to secure by Letters Patent of the United States is:

1. A method of producing a tubular body of sintered polycrystalline alumina consisting essentially of relatively uniform size equiaxed grains of alumina which contains no more than about 150 ppm magnesium and essentially no secondary phase or pores, said alumina body exhibiting improved in-line transmission, which comprises
    (a) preparing a mixture of high purity alumina powder having relatively uniform surface area and particle size distribution with a small but effective amount up to 0.1 weight percent finely divided magnesia and a binder,
    (b) extruding the mixture to form a green tubular body having a density of at least 30 percent of theoretical density for a single crystal of alumina,
    (c) presintering the green tubular body in an oxygen containing atmosphere at a temperature from about 950° C. to about 1200° C. for a sufficient time period to remove said binder, and
    (d) sintering the presintered tubular body at about 1700°-1950° C. in an environment selected from the group consisting of vacuum and hydrogen for a sufficient time period to produce a sintered body of polycrystalline alumina consisting essentially of relatively uniform size equiaxed grains of alumina which contains no more than about 150 ppm magnesium and essentially no secondary phase and pores, said body exhibiting improved optical transmission characterized by especially improved in-line transmission.

2. A method as in claim 1 wherein the high purity alumina powder has an average diameter in the submicron size range, a surface area of 8-9 m²/gm, and a maximum agglomerate size not exceeding about 10 microns.

* * * * *